(12) United States Patent
Kirk

(10) Patent No.: US 10,730,625 B1
(45) Date of Patent: Aug. 4, 2020

(54) PAYLOAD EJECTOR WITH SHOCK ATTENUATION DEVICE

(71) Applicant: Raytheon Company, Waltham, MA (US)

(72) Inventor: Joshua J. Kirk, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/272,593

(22) Filed: Feb. 11, 2019

(51) Int. Cl.
*B64D 1/06* (2006.01)
*F42B 3/00* (2006.01)

(52) U.S. Cl.
CPC .............. *B64D 1/06* (2013.01); *F42B 3/006* (2013.01)

(58) Field of Classification Search
CPC ... B64D 1/02; B64D 1/04; B64D 1/06; B64D 37/12
USPC ............ 89/1.54, 1.59; 244/137.4; 294/82.26
See application file for complete search history.

(56) References Cited

U.S. PATENT DOCUMENTS

| | | | |
|---|---|---|---|
| 2,869,523 A * | 1/1959 | Murphy | B64D 1/06 60/638 |
| 4,050,656 A | 9/1977 | Peterson | |
| 4,075,929 A * | 2/1978 | Peterson | F15B 15/16 91/168 |
| 4,088,287 A * | 5/1978 | Hasquenoph | B64D 1/06 244/137.4 |
| 4,572,053 A * | 2/1986 | Sosnowski | B64D 1/06 89/1.51 |
| 4,850,553 A | 7/1989 | Takata et al. | |
| 4,964,595 A * | 10/1990 | Nordhaus | B64D 1/06 244/137.4 |
| 5,755,407 A * | 5/1998 | Aubret | B64G 1/641 244/137.4 |
| 5,932,829 A | 8/1999 | Jakubowski, Jr. | |
| 6,073,886 A * | 6/2000 | Jakubowski, Jr. | B64D 1/04 244/137.4 |
| 6,481,669 B1 * | 11/2002 | Griffin | B64D 1/04 244/137.4 |
| 7,083,148 B2 | 8/2006 | Bajuyo et al. | |
| 2013/0048790 A1 * | 2/2013 | Tobias | B64D 1/06 244/137.4 |

OTHER PUBLICATIONS

NavyBMR, "Suspension, Arming, and Releasing Equipment", navybmr.com/study%20material/NAVEDTRA%2014313B/14313B_ch10.pdf, Jul. 2016, 31 pages.

* cited by examiner

*Primary Examiner* — Bret Hayes

(57) ABSTRACT

A system includes a payload ejector configured to contact a payload carried by a flight vehicle and to push the payload away from the flight vehicle. The payload ejector includes a piston configured to extend from the payload ejector and a shock attenuator coupled to the piston, where the shock attenuator is configured to push the payload away from the flight vehicle. The shock attenuator includes a shock attenuator housing and a plunger that is movable within the shock attenuator housing and that extends from the shock attenuator housing. The plunger is configured to be pushed at least partially into the shock attenuator housing in order to damp a shock pulse applied to the payload. The shock attenuator housing may have an interior space, and the shock attenuator may further include a spring, compliant material, or fluid within the interior space.

20 Claims, 7 Drawing Sheets

PAYLOAD EJECTOR WITH SHOCK ATTENUATION DEVICE

GOVERNMENT RIGHTS

This invention was made with U.S. government support under contract no. FA8672-17-F-4002 awarded by the U.S. Air Force. The U.S. government may have certain rights in this invention.

TECHNICAL FIELD

This disclosure generally relates to payload ejection or release systems for aircraft or other flight vehicles. More specifically, this disclosure relates to a payload ejector with at least one shock attenuation device.

BACKGROUND

Various types of aircraft or other flight vehicles often carry payloads that need to be ejected or released from the flight vehicles during flight. For example, jets and drones often carry missiles, bombs, fuel pods, or other payloads under their wings or bodies. Often times, a payload needs to be physically pushed away from a flight vehicle when the payload is ejected or released. In these cases, an ejection unit (also referred to as a release unit) can activate one or more ejector pistons that quickly extend outward from the flight vehicle to contact the payload and push the payload away from the flight vehicle.

SUMMARY

This disclosure provides a payload ejector with at least one shock attenuation device.

In a first embodiment, an apparatus includes a shock attenuator configured to be coupled to a piston of a payload ejector. The shock attenuator is configured to contact a payload carried by a flight vehicle and to push the payload away from the flight vehicle. The shock attenuator includes a shock attenuator housing and a plunger movable within the shock attenuator housing and extending from the shock attenuator housing. The plunger is configured to be pushed at least partially into the shock attenuator housing in order to damp a shock pulse applied to the payload.

In a second embodiment, a system includes a payload ejector configured to contact a payload carried by a flight vehicle and to push the payload away from the flight vehicle. The payload ejector includes a piston configured to extend from the payload ejector and a shock attenuator coupled to the piston, where the shock attenuator is configured to push the payload away from the flight vehicle. The shock attenuator includes a shock attenuator housing and a plunger movable within the shock attenuator housing and extending from the shock attenuator housing. The plunger is configured to be pushed at least partially into the shock attenuator housing in order to damp a shock pulse applied to the payload.

In a third embodiment, a method includes extending a piston from a payload ejector, contacting a payload carried by a flight vehicle using a shock attenuator coupled to the piston, and pushing the payload away from the flight vehicle using the shock attenuator and the piston. The shock attenuator includes a shock attenuator housing and a plunger movable within the shock attenuator housing and extending from the shock attenuator housing. The plunger is configured to be pushed at least partially into the shock attenuator housing in order to damp a shock pulse applied to the payload.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, various types of aircraft or other flight vehicles carry payloads that need to be ejected or released from the flight vehicles during flight. Often times (such as with a missile or bomb), a payload needs to be physically pushed away from a flight vehicle when the payload is ejected or released. An ejection unit (also referred to as a release unit) can be used to activate one or more ejector pistons, which quickly extend outward from the flight vehicle to contact the payload and push the payload away from the flight vehicle. However, in many instances, the ejector pistons can impart a high-frequency shock pulse to the payload being ejected or released. If the payload contains sensitive components, it is possible for the high-frequency shock pulse to damage those components. In some cases, this can actually lead to failure of those components and possibly failure of the entire payload itself. This can be particularly problematic for "smart" weapons or other "smart" payloads, which typically contain sensitive electronics that can be damaged by high-frequency shock pulses.

This disclosure provides a payload ejector that contains at least one ejector piston having at least one shock attenuation device. Each shock attenuation device generally operates to elongate a shock pulse that is applied to a payload when an ejector piston contacts or pushes the payload. By elongating the shock pulse, the magnitude of the shock pulse is decreased, essentially spreading out the shock pulse over a longer period of time. Among other things, this approach helps to reduce or prevent damage to sensitive components (such as sensitive electronics) in the payload. Moreover, this approach can be retrofitted into existing ejection and release units, allowing legacy systems used in flight vehicles to be upgraded for use with modern smart payloads (and without requiring modifications to the smart payloads). Further, each shock attenuation device can function as a damper system, and each damper system can be tuned to adjust separation characteristics of the payload.

Figure 1:
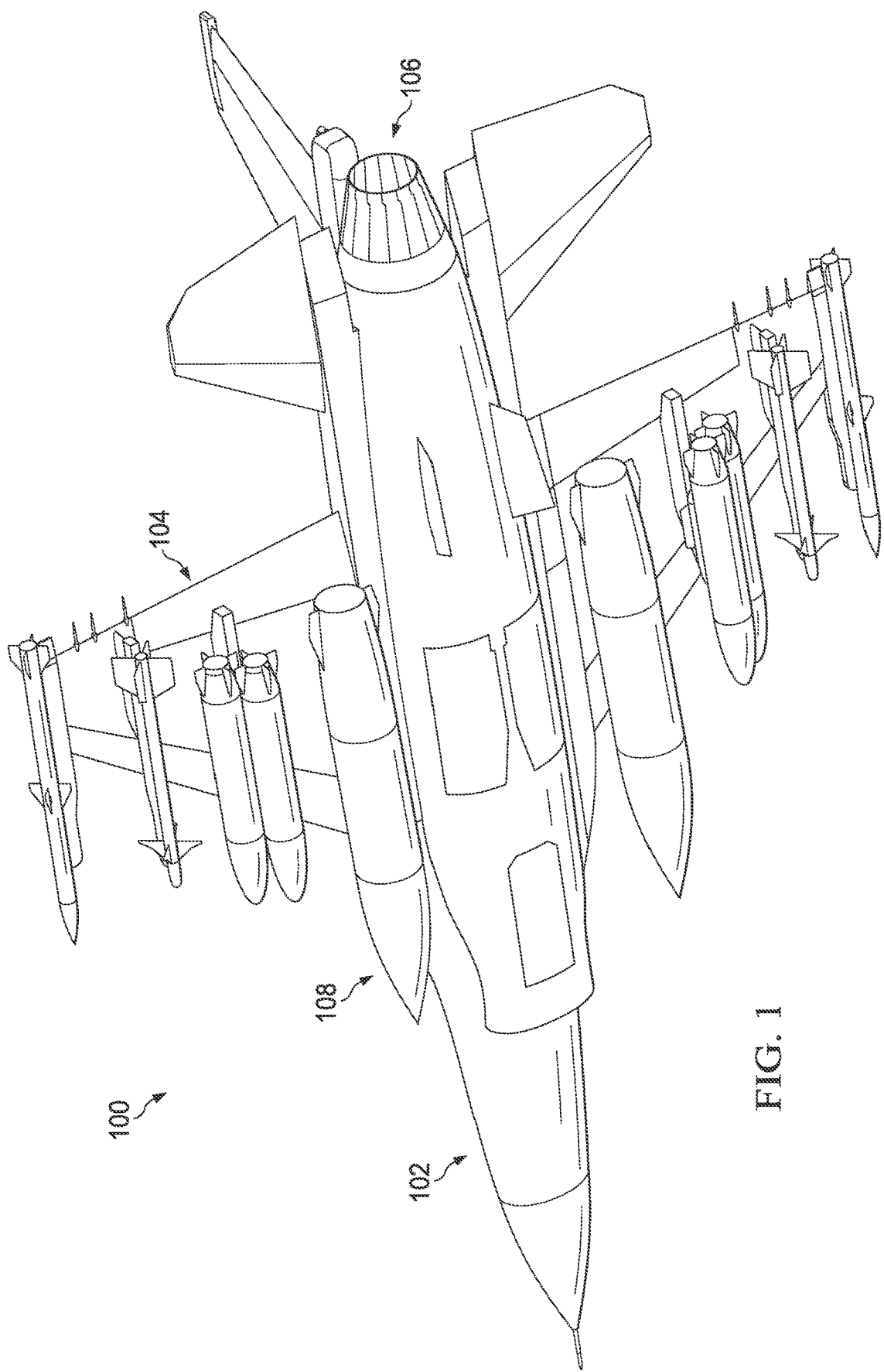
FIG. 1 illustrates an example flight vehicle having one or more payload ejectors with shock attenuation devices in accordance with this disclosure.

FIG. 1 illustrates an example flight vehicle 100 having one or more payload ejectors with shock attenuation devices in accordance with this disclosure. As shown in FIG. 1, the flight vehicle 100 in this example represents an aircraft having a body 102, wings 104, and a tail assembly 106. Of course, there are numerous types of aircraft having various forms, and the design of the body 102, wings 104, and tail assembly 106 shown here are for illustration only.

The flight vehicle 100 here carries one or more payloads 108. In this example, the payloads 108 are carried under the wings 104 of the flight vehicle 100. However, one or more payloads 108 can be carried in other locations, such as under the body 102 of the flight vehicle 100. Each payload 108 represents any suitable object carried by the flight vehicle 100, such as a missile, rocket, fuel pod, micro-drones, surveillance package, or other device(s).

At least one of the payloads 108 carried by the flight vehicle 100 represents an object that is ejected or released by a payload ejector. As described in more detail below, at least one payload ejector used with the flight vehicle 100 includes one or more ejector pistons, where each ejector piston is configured when activated to extend away from the flight vehicle 100 and push one of the payloads 108 away from the flight vehicle 100. Also, as described in more detail below, at least one of the ejector pistons includes a shock attenuation device, which is used to attenuate a shock pulse applied by the ejector piston to the associated payload 108.

The ability to attenuate a shock pulse applied to a payload 108 can help to reduce or prevent damage to sensitive components of the payload 108. As a result, there is much less likelihood that the payload 108 will fail due to the shock pulses applied to the payload 108 during ejection/release. Also, shock attenuation devices can be retrofitted into existing ejection and release units, such as into ejector pistons used in the existing ejection and release units. This allows the shock attenuation functionality to be incorporated into a number of existing flight vehicles while also allowing the shock attenuation functionality to be incorporated into new ejection and release units. As a particular example of this, the shock attenuation functionality described in this patent document can be retrofitted into existing legacy ejector racks, enabling the legacy ejector racks to be used with smart payloads (and without requiring modifications to the smart payloads). In addition, the shock attenuation devices can function as damper systems, thereby introducing compliance when a payload ejector contacts a payload 108. The damper systems can also be tuned to adjust separation characteristics of a payload 108. For instance, when two ejector pistons are used front and aft of a payload 108, the forward and aft damper systems can be tuned to apply different forces to the payload 108. Among other things, this may allow for improved pitch characteristics of the payload 108 after ejection/release. In addition, the payload ejector is designed such that, even if it fails during ejection or release of a payload, the ejector functionality will not be degraded, and the payload will still safely separate from the flight vehicle 100.

Although FIG. 1 illustrates one example of a flight vehicle 100 having one or more payload ejectors with shock attenuation devices, various changes may be made to FIG. 1. For example, payload ejectors with shock attenuation devices may be used with any suitable flight vehicles carrying any suitable payloads. While a specific flight vehicle 100 and specific payloads 108 are shown in FIG. 1, the flight vehicle 100 and payloads 108 are for illustration only.

Figure 2A:
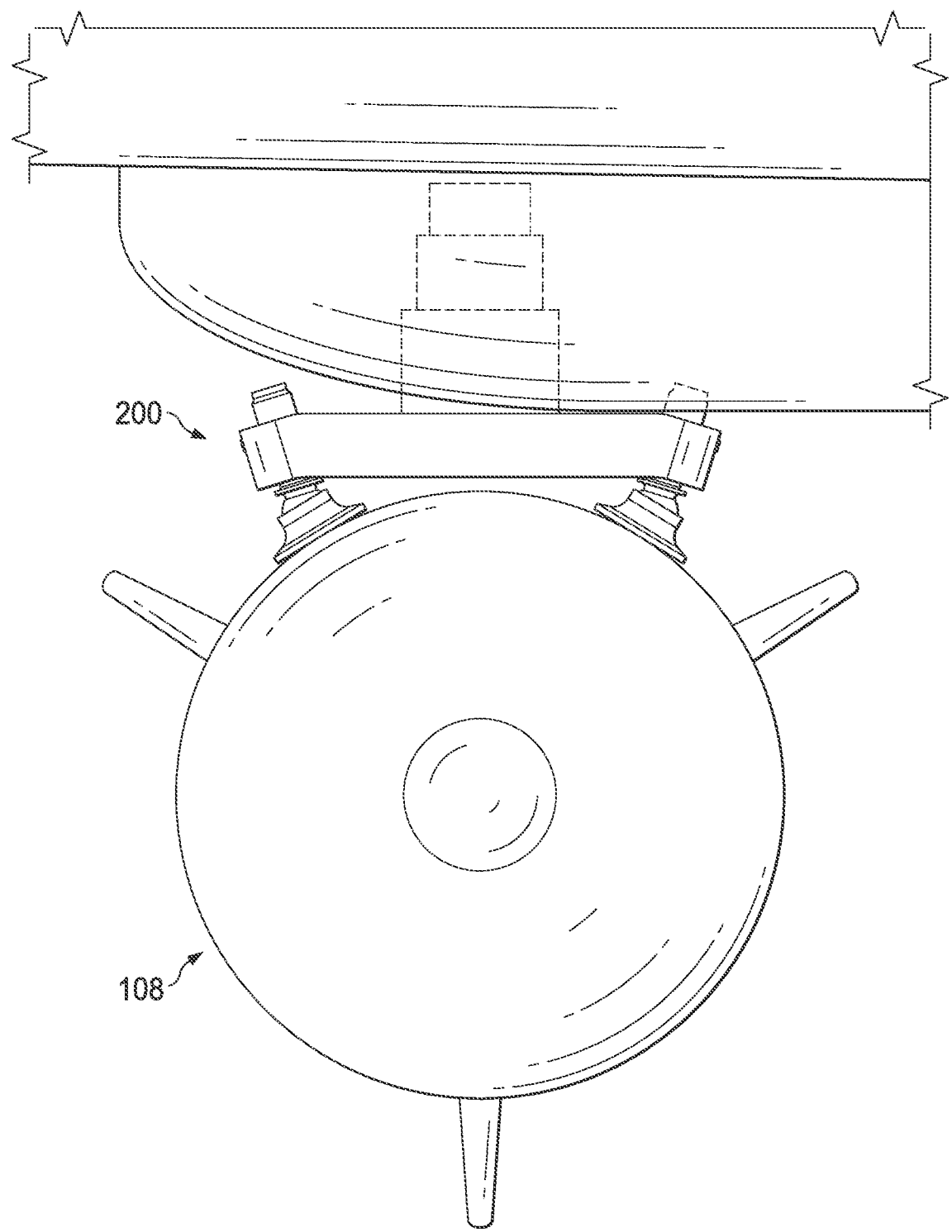
FIGS. 2A through 2C illustrate an example use of a payload ejector with at least one shock attenuation device in accordance with this disclosure.
Figure 2B:
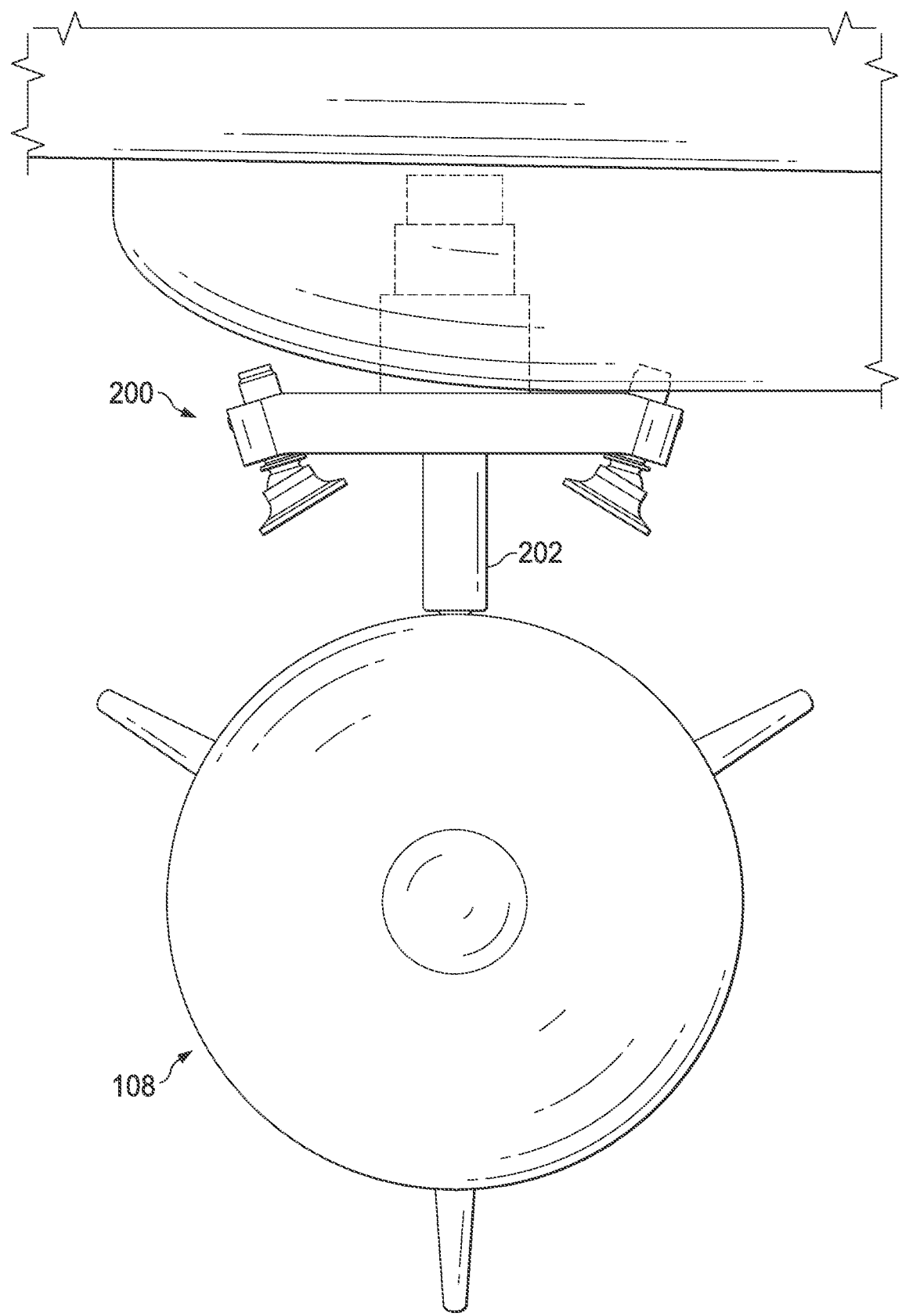
Figure 2C:
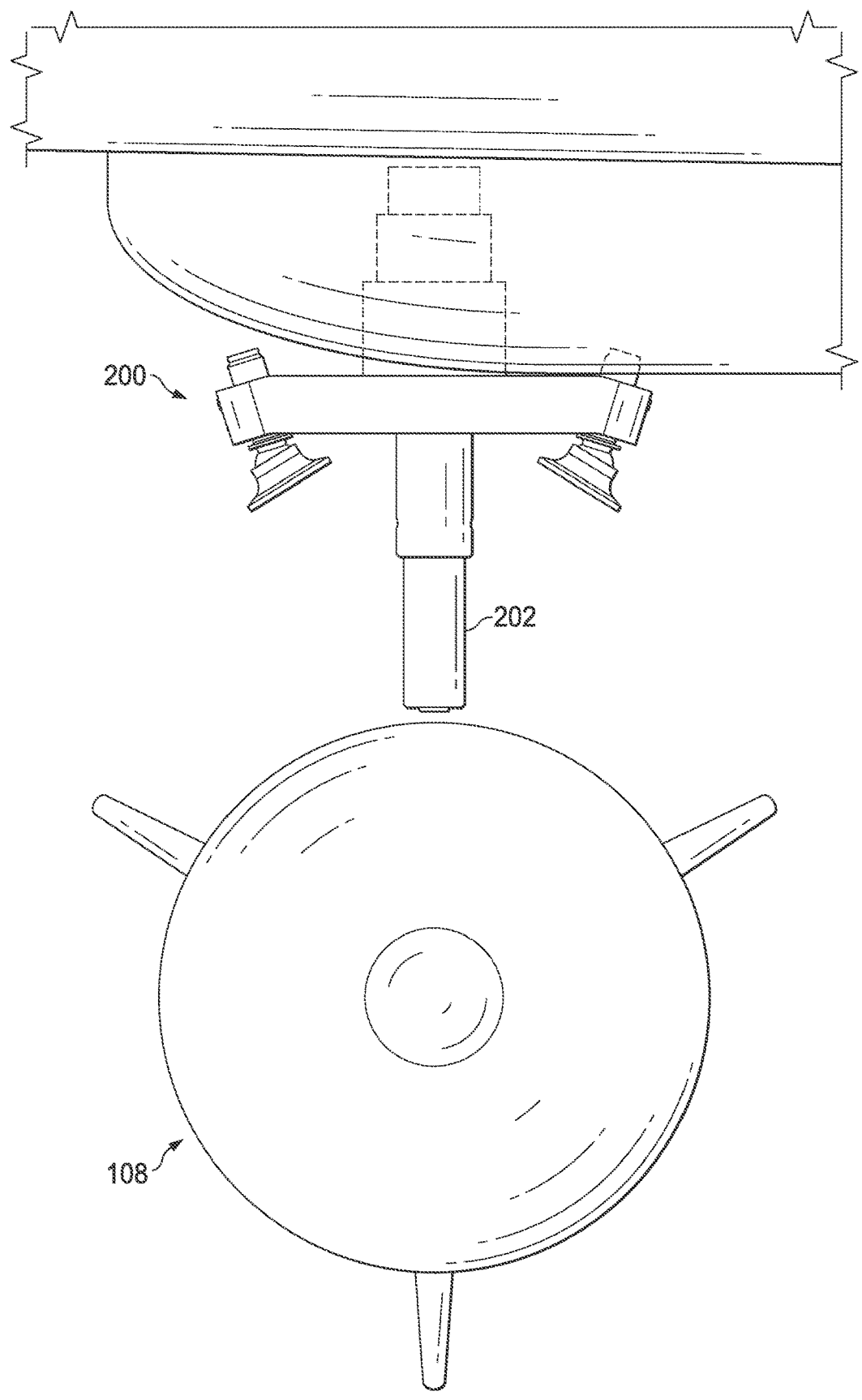

FIGS. 2A through 2C illustrate an example use of a payload ejector 200 with at least one shock attenuation device in accordance with this disclosure. For ease of explanation, the payload ejector 200 shown in FIGS. 2A through 2C is described as being used with the flight vehicle 100 and one of the payloads 108 shown in FIG. 1. However, the payload ejector 200 can be used with any other suitable flight vehicle and any other suitable payload.

As shown in FIG. 2A, a payload 108 is attached to a portion of the flight vehicle 100 using the payload ejector 200. For example, the payload ejector 200 may be mounted under a body 102 or a wing 104 of the flight vehicle 100. In the state shown in FIG. 2A, the payload ejector 200 has not been triggered, so the payload 108 is held relatively close to the flight vehicle 100. Ideally, in this configuration, the payload ejector 200 secures the payload 108 to the flight vehicle 100 with little or no movement of the payload 108.

As shown in FIG. 2B, the payload ejector 200 has been triggered, and one or more ejector pistons 202 have begun to extend away from the payload ejector 200. The ejector pistons 202 here have also started pushing against the payload 108 to move the payload 108 away from the flight vehicle 100. As a result, the payload 108 has separated from the flight vehicle 100 by a small amount. As shown in FIG. 2C, the one or more ejector pistons 202 have completely extended away from the payload ejector 200, pushing the payload 108 away from the flight vehicle 100 by a larger amount.

As described in more detail below, in some embodiments, each ejector piston 202 can be designed using an outer sleeve and an inner sleeve within the outer sleeve. The outer sleeve generally extends from the payload ejector 200 in FIG. 2B, and the inner sleeve generally extends from the outer sleeve in FIG. 2C. Also, as described in more detail below, the bottom end of at least one of the ejector pistons 202 that contacts the payload 108 includes a shock attenuation device. As noted above, the shock attenuation device helps to reduce or minimize a high-frequency shock pulse applied to the payload 108 by the associated ejector piston 202.

Although FIGS. 2A through 2C illustrate one example use of a payload ejector 200 with at least one shock attenuation device, various changes may be made to FIGS. 2A through 2C. For example, the payload ejector 200 may be used with any suitable flight vehicles carrying any suitable payloads. While a specific flight vehicle 100 and a specific payload 108 are shown in FIGS. 2A through 2C, the flight vehicle 100 and payload 108 are for illustration only. Also, the payload ejector 200 can include any number of ejector pistons 202, and any number of those ejector pistons 202 may include a shock attenuation device. As particular examples, the payload ejector 200 may include two ejector pistons 202 (such as one at the front and one at the back of the payload 108) or a single ejector piston 202 (such as one in the middle of the payload 108).

Figure 3:
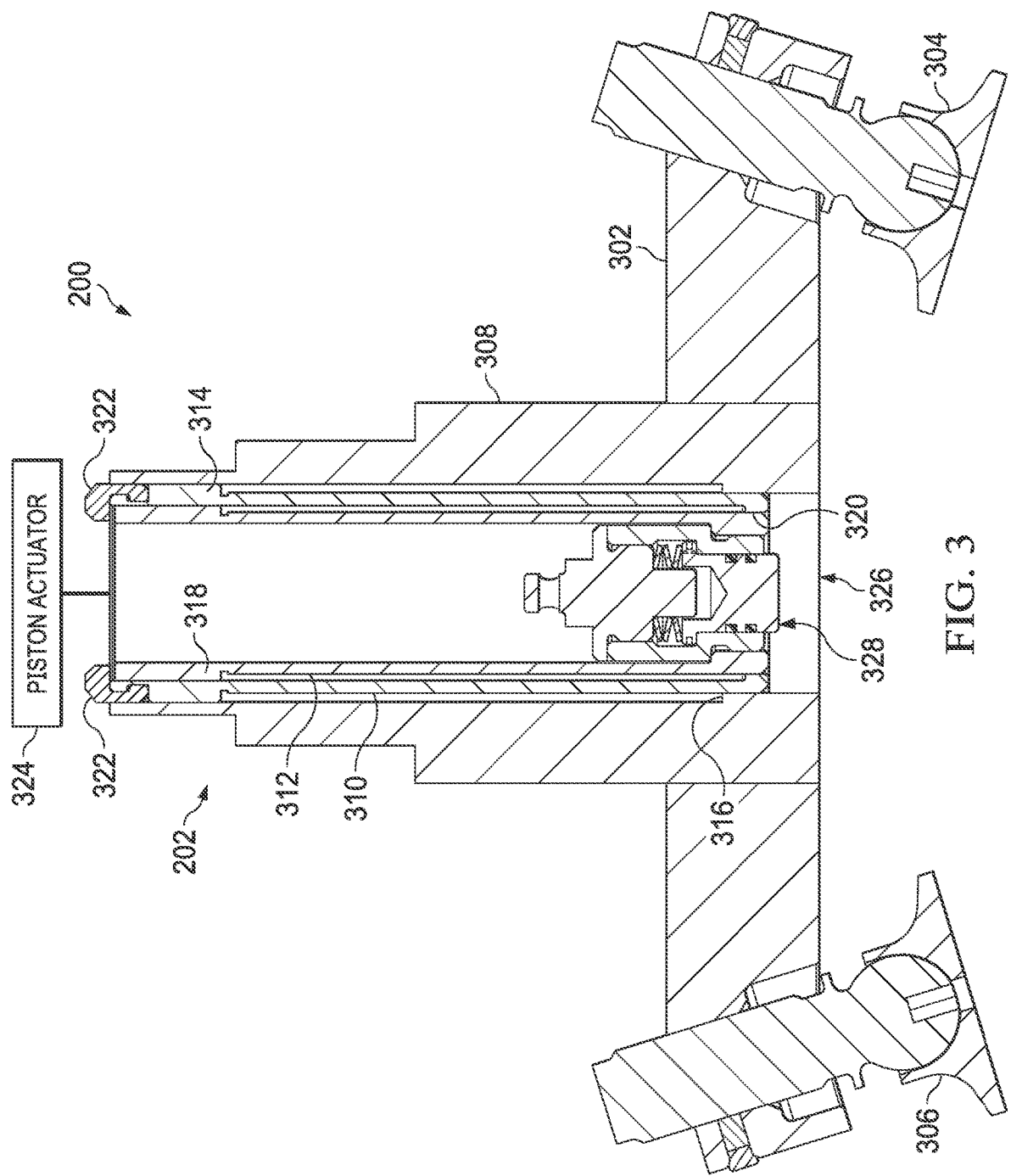
FIG. 3 illustrates a portion of an example payload ejector with at least one shock attenuation device in accordance with this disclosure.

FIG. 3 illustrates a portion of an example payload ejector 200 with at least one shock attenuation device in accordance with this disclosure. In particular, FIG. 3 illustrates a cross-sectional view of an example payload ejector 200. For ease of explanation, the payload ejector 200 shown in FIG. 3 is described as being used with the flight vehicle 100 and one of the payloads 108 shown in FIG. 1. However, the payload ejector 200 can be used with any other suitable flight vehicle and any other suitable payload.

As shown in FIG. 3, the payload ejector 200 includes an ejector housing 302 and multiple mounting pads 304, 306 extending from the ejector housing 302. The ejector housing 302 generally represents a structure that can receive and retain other components of the payload ejector 200, such as one or more ejector pistons 202. The ejector housing 302 can be formed from any suitable material(s), such as one or more metals. The ejector housing 302 can also be formed in any suitable manner, such as machining, molding, welding, or additive manufacturing. In addition, the ejector housing 302 can have any suitable size, shape, and dimensions.

The mounting pads 304, 306 generally extend downward from the ejector housing 302 and are used to contact a payload 108. The mounting pads 304, 306 also help to reduce or prevent side-to-side movement of the payload 108 during operation of the flight vehicle 100. Each pad 304, 306 can be formed from any suitable material(s), such as one or more metals. Each pad 304, 306 can also be formed in any suitable manner, such as machining, molding, welding, or additive manufacturing. In addition, each pad 304, 306 can have any suitable size, shape, and dimensions. In this example, each pad 304, 306 generally includes a lower portion that contacts a payload 108 and that can swivel with respect to a tightening screw threaded into the ejector housing 302. However, the mounting pads 304, 306 can have any other suitable designs.

The ejector housing 302 in FIG. 3 includes or is coupled to a piston housing 308 that extends upward and contains one of the ejector pistons 202. In this example, the ejector piston 202 includes an outer sleeve 310 and an inner sleeve 312. The piston housing 308 generally represents a structure that receives and secures the sleeves 310, 312. In some embodiments, the piston housing 308 may be integral to the ejector housing 302 and therefore fixed with respect to the remainder of the ejector housing 302. In other embodiments, the piston housing 308 may include one or more components that are permitted to move relative to the ejector housing 302.

The outer sleeve 310 is movable up and down within the piston housing 308. In this example, the outer sleeve 310 includes one or more projections 314 extending from one or more outer sides of the outer sleeve 310, and the piston housing 308 includes one or more stops 316 extending from one or more inner surfaces of the piston housing 308. The one or more stops 316 of the piston housing 308 can contact the one or more projections 314 of the outer sleeve 310 to limit downward movement of the outer sleeve 310 within the piston housing 308 and to prevent the outer sleeve 310 from being ejected from the piston housing 308.

The inner sleeve 312 is movable up and down within the outer sleeve 310. In this example, the inner sleeve 312 include one or more projections 318 extending from one or more outer sides of the inner sleeve 312, and the outer sleeve 310 includes one or more stops 320 extending from one or more inner surfaces of the outer sleeve 310. The one or more stops 320 of the outer sleeve 310 can contact the one or more projections 318 of the inner sleeve 312 to limit downward movement of the inner sleeve 312 within the outer sleeve 310 and to prevent the inner sleeve 312 from being ejected from the outer sleeve 310. Also, at least one hard stop 322 is connected to the outer sleeve 310 and extends over at least a portion of the inner sleeve 312, which limits upward movement of the inner sleeve 312 within the outer sleeve 310.

As can be seen here, the outer and inner sleeves 310, 312 form a telescopic ejector piston 202 that can be extended from the payload ejector 200 towards a payload 108 in order to push the payload 108 away from a flight vehicle 100. However, it should be noted that the use of a telescopic piston structure is not required here. In other embodiments, for example, the ejector piston 202 can be formed using a single structure that extends from the payload ejector 200 towards a payload 108.

The piston housing 308, the outer sleeve 310, and the inner sleeve 312 can each be formed from any suitable material(s), such as one or more metals. Also, the piston housing 308, the outer sleeve 310, and the inner sleeve 312 can each be formed in any suitable manner, such as machining, molding, welding, or additive manufacturing. In addition, the piston housing 308, the outer sleeve 310, and the inner sleeve 312 can each have any suitable size, shape, and dimensions. In some embodiments, for example, the piston housing 308 defines a generally cylindrical space, the outer sleeve 310 is generally cylindrical and fits within the piston housing 308, and the inner sleeve 312 is generally cylindrical and fits within the outer sleeve 310. Of course, each of these components can have any other suitable form factor.

A piston actuator 324 is configured, when triggered, to generate the force used to extend the ejector piston 202 through an opening 326 in the housing 302 in order to contact a payload 108. The piston actuator 324 can use any suitable mechanism to generate force and activate the ejector piston 202. In some embodiments, the piston actuator 324 provides fluid into the ejector housing 302 or the piston housing 308 in order to cause extension of the ejector piston 202. As a particular example, the piston actuator 324 can include a small combustible or pyrotechnic device (such as a cartridge) that can be activated to generate hot gases that cause the outer sleeve 310 and the inner sleeve 312 to be extended through the opening 326. If needed or desired, seals can be used between the piston housing 308 and the outer sleeve 310 and between the outer sleeve 310 and the inner sleeve 312 (such as in the projections 314 and 318) to help facilitate extension of the ejector piston 202 using the fluid. Note that while the piston actuator 324 here appears to be positioned outside the ejector housing 302 in FIG. 3, the ejector housing 302 can be configured to accommodate the piston actuator 324 (possibly with any number of other components of the payload ejector 200). In other embodiments, protective elements can be positioned around the piston actuator 324 and secured to the ejector housing 302.

A shock attenuation device 328 (also known as a shock attenuator) is integrated into or otherwise coupled to the bottom end of the ejector piston 202 in FIG. 3. The shock attenuation device 328 essentially functions as a damper system that provides compliance to lengthen a shock pulse applied to the payload 108 when the ejector piston 202 contacts or pushes against the payload 108. As noted above, by elongating the shock pulse, the magnitude of the shock pulse is decreased, spreading out the shock pulse over a longer period of time and helping to reduce or prevent damage to sensitive components in the payload 108. The shock attenuation device 328 includes any suitable structure for attenuating or damping shock pulses. One example implementation of the shock attenuation device 328 is described below.

In some embodiments, the payload ejector 200 can be fabricated by obtaining the ejector housing 302 and inserting the components of the ejector piston 202 through the top of the piston housing 308. Once the ejector piston 202 is properly arranged within the ejector housing 302, the hard stop 322 can be attached to the piston housing 308. For example, the hard stop 322 can be threaded and engage with corresponding threads of the piston housing 308. Of course, the payload ejector 200 can also be fabricated in any other suitable manner.

Although FIG. 3 illustrates one portion of an example payload ejector 200 with at least one shock attenuation device 328, various changes may be made to FIG. 3. For example, a shock attenuation device 328 can be used with any other suitable payload ejectors, including those that do not use telescopic sleeves and those that use more than two telescopic sleeves.

Figure 4:
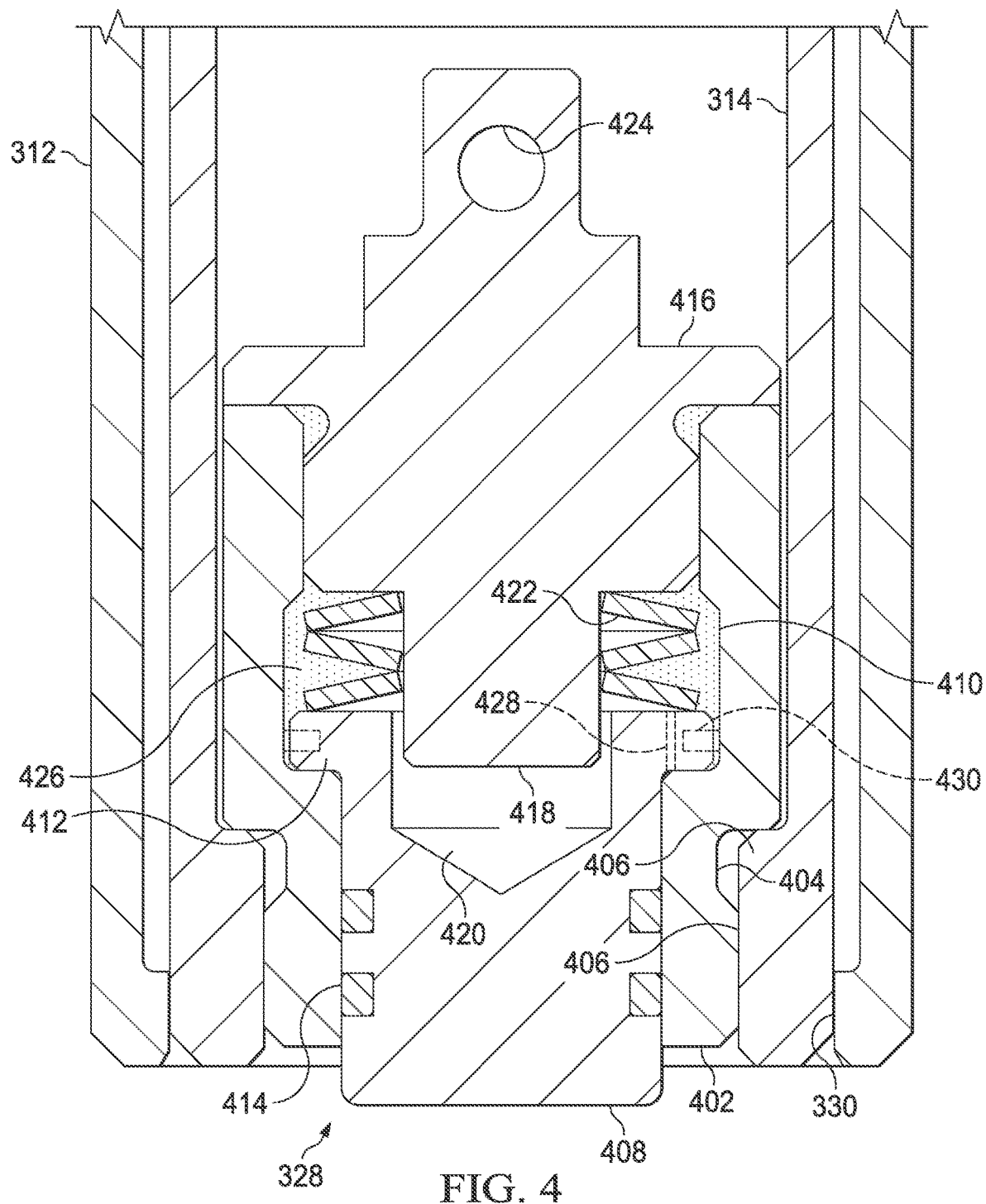
FIG. 4 illustrates an example shock attenuation device for use in a payload ejector in accordance with this disclosure.

FIG. 4 illustrates an example shock attenuation device 328 for use in a payload ejector in accordance with this disclosure. In particular, FIG. 4 illustrates a cross-sectional view of an example shock attenuation device 328. For ease of explanation, the shock attenuation device 328 shown in FIG. 4 is described as being used with the payload ejector 200 shown in FIG. 3. However, the shock attenuation device 328 can be used with any other suitable payload ejector.

As shown in FIG. 4, the shock attenuation device 328 includes a shock attenuator housing 402. The housing 402 generally represents a structure that receives and retains other components of the shock attenuation device 328. The housing 402 can be formed from any suitable material(s), such as one or more metals or ruggedized plastic. The housing 402 can also be formed in any suitable manner, such as machining, molding, welding, or additive manufacturing. In addition, the housing 402 can have any suitable size, shape, and dimensions. The housing 402 fits substantially within an ejector piston 202 and, in this example, within the inner sleeve 312 of the ejector piston 202. In some embodiments, the housing 402 is designed to thread into the bottom end of the inner sleeve 312. Also, in some embodiments, the housing 402 can include one or more notches 404 configured to engage with one or more projections 406 of the inner sleeve 312. Here, the lower portion of the housing 402 is narrower and is configured to fit within a narrower portion of the inner sleeve 312 between the one or more projections 406. The upper portion of the housing 402 is wider, which can help to limit downward movement of the housing 402 and ensure that the housing 402 is properly positioned within the inner sleeve 312.

A plunger 408 in inserted through and partially extends from the housing 402. The plunger 408 is movable up and down within an interior space 410 of the housing 402. The plunger 408 can be formed from any suitable material(s), such as one or more metals or ruggedized plastic. The plunger 408 can also be formed in any suitable manner, such as machining, molding, welding, or additive manufacturing. In addition, the plunger 408 can have any suitable size, shape, and dimensions. In this example, the plunger 408 includes one or more flanges 412 that limit downward movement of the plunger 408 within the interior space 410 of the housing 402. Also, the plunger 408 includes one or more seals 414 (such as one or more O-rings), which help to prevent fluid leaking into or out of the interior space 410 of the housing 4022 and to prevent dirt or other substances from entering the interior space 410.

A cap 416 is secured to the housing 402 above the plunger 408, which helps to secure the plunger 408 within the housing 402. The cap 416 can be secured to the housing 402 in any suitable manner, such as when the cap 416 is threaded and engages with corresponding threads of the housing 402. In this example, a lower portion 418 of the cap 416 fits within a recess 420 of the plunger 408, which helps to maintain alignment of the plunger 408 and the cap 416 axially (up and down in FIG. 4).

A spring or pliant material 422 is positioned at least partially around the lower portion 418 of the cap 416 and forms a damper system. The spring or pliant material 422 can generally bias the plunger 408 so that the lower portion of the plunger 408 extends outside the housing 402 and below the bottom ends of the sleeves 310, 312. However, the spring or pliant material 422 allows the plunger 408 to move upward so that the lower portion of the plunger 408 moves substantially or completely inside the housing 402. In this example, the spring or pliant material 422 represents a spring, although any suitable material that is pliant and therefore allows the plunger 408 to move upward and downward can be used here (such as rubber or plastic).

The cap 416 here is generally dimensioned to restrain the plunger 408 and the spring or pliant material 422 (the damper system). The cap 416 in this example also includes an opening 424 in an upper portion of the cap 416. The opening 424 allows the cap 416 to be pulled in order to retract the ejector piston 202 after use. Note, however, that other forms of the cap 416 or other mechanisms can be used in order to allow the ejector piston 202 to be retracted after use.

Optionally, in some embodiments, the interior space 410 of the housing 402 can be partially or completely filled with a fluid 426, such as hydraulic fluid or other fluid. Also, at least one orifice 428 can optionally be provided through at least one portion of the plunger 408. In this example, at least one orifice 428 extends through the at least one flange 412 of the plunger 408. The orifice 428 allows the fluid 426 to pass through the plunger 408 as the plunger 408 moves upward or downward within the housing 402. Effectively, the fluid 426 here is used to provide additional damping of shock pulses (in addition to the damping provided by the spring or pliant material 422). To support the use of the fluid 426 in this manner, the plunger 408 may optionally include one or more additional seals 430 (such as one or more O-rings), which can help to limit or prevent fluid flow around the flanges 412 of the plunger 408 and confine fluid flow through the orifice(s) 428. However, other embodiments can also be used, such as embodiments where the seal(s) 430 and possibly the orifice(s) 428 are omitted and the fluid 426 is allowed to flow between the plunger 408 and the housing 402. Also note that any number of orifices 428 in any suitable arrangement can be used here.

In the shock attenuation device 328 shown in FIG. 4, the plunger 408 is ordinarily pushed downward prior to use (typically due to the spring or pliant material 422). In this state, the spring or pliant material 422 can push the plunger 408 downward to its maximum extent, which may allow the plunger 408 to fill the gap between the shock attenuation device 328 and a payload 108 to the maximum extent possible. The components of the shock attenuation device 328 can also be sized or otherwise designed to provide a desired amount of preload on the payload 108, which can help to ensure adequate contact with the payload 108. Upon triggering of the associated ejector piston 202, the sleeves 310, 312 are pushed outward, causing the plunger 408 to push against the payload 108. The plunger 408 is allowed to move up and inward into the housing 402 as the payload 108 is being pushed, and the spring or pliant material 422 (and optionally the fluid 426) can help to damp the shock pulse applied by the ejector piston 202 to the payload 108. Ideally, the shock attenuation device 328 is designed so that the plunger 408 maximizes its travel during an ejection event so that the shock pulse is elongated to the maximum possible extent. In this way, the shock attenuation device 328 provides a damper system that is integral with the ejector piston 202, allowing use of the shock attenuation device 328 wherever the ejector piston 202 can be installed.

The amount of damping provided by the shock attenuation device 328 can be tuned as needed or desired, such as to adjust separation characteristics of a payload 108 from a flight vehicle 100. As noted above, for example, the damper systems used in forward and aft ejector pistons 202 can be tuned to apply different forces to the payload 108. In some embodiments, each shock attenuation device 328 may be used to provide a spring constant of between about 5,000 and about 10,000 pounds per inch (about 8,756 to about 17,513 newtons per centimeter). Of course, each shock attenuation device 328 can provide any other suitable damping forces.

Although FIG. 4 illustrates one example of a shock attenuation device 328 for use in a payload ejector, various changes may be made to FIG. 4. For example, the relative sizes, shapes, and dimensions of the components in the shock attenuation device 328 are for illustration only and can vary as needed or desired. Also, the shock attenuation device 328 can be used with any other suitable payload ejectors, including those that do not use telescopic sleeves and those that use more than two telescopic sleeves.

Figure 5:
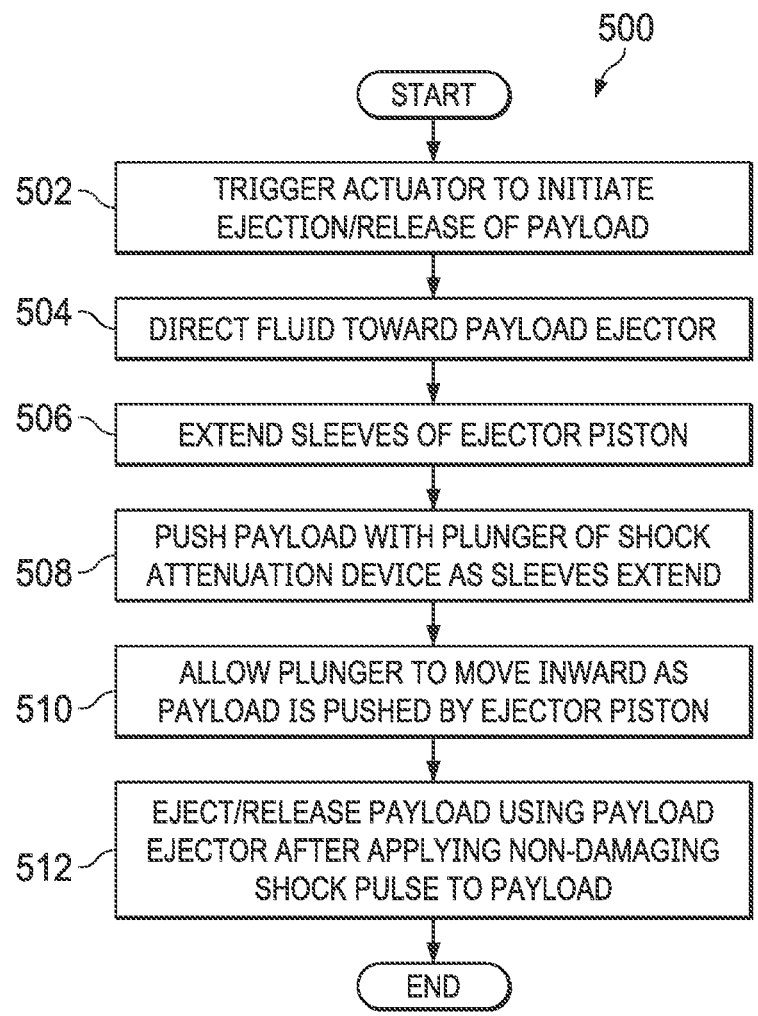
FIG. 5 illustrates an example method for using a payload ejector with at least one shock attenuation device in accordance with this disclosure.

FIG. 5 illustrates an example method 500 for using a payload ejector with at least one shock attenuation device in accordance with this disclosure. For ease of explanation, the method 500 shown in FIG. 5 is described as involving the use of the payload ejector 200 and the shock attenuation device 328 with the flight vehicle 100 and one of the payloads 108. However, the method 500 can be used with any other suitable payload ejector, shock attenuation device, flight vehicle, and payload.

As shown in FIG. 5, an actuator is triggered to initiate ejection/release of a payload at step 502, and fluid is directed towards a payload ejector at step 504. This can include, for example, a pilot or other operator of the flight vehicle 100 initiating the launching of a missile or the dropping of a bomb. This can also include a control system triggering the piston actuator 324 in order to provide fluid into the ejector housing 302 or the piston housing 308 of the payload ejector 200.

One or more sleeves of an ejector piston of the payload ejector are extended at step 506. This can include, for example, the fluid from the piston actuator 324 pushing the outer and inner sleeves 310, 312 of the ejector piston 202 outward from the piston housing 308 and pushing the inner sleeve 312 outward from the outer sleeve 310. This causes a plunger of a shock attenuation device in the payload ejector to push against the payload at step 508. This can include, for example, the plunger 408 of the shock attenuation device 328 pushing against the payload 108 in order to push the payload 108 away from the flight vehicle 100. During this time, the plunger is allowed to move inward into the ejector piston at step 510. This can include, for example, the plunger 408 moving inward into the interior space 410 of the housing 402 in the shock attenuation device 328. The spring or pliant material 422 and optionally the fluid 426 in the interior space 410 of the housing 402 help to slow the inward movement of the plunger 408. As a result, the payload is ejected/released using the payload ejector after a non-damaging shock pulse has been applied to the payload at step 512.

Although FIG. 5 illustrates one example of a method 500 for using a payload ejector with at least one shock attenuation device, various changes may be made to FIG. 5. For example, while shown as a series of steps, various steps in FIG. 5 can overlap or occur in parallel.

Note that in the above description, various directional terms such as "upward," "downward," "up," and "down" have been used to describe various components or operations of those components. These directional terms are used above merely for convenience and are made with reference to particular orientations of components shown in the drawings. However, these terms do not limit the scope of this disclosure or how an ejector piston or shock attenuation device can be used. An ejector piston or shock attenuation device can be used in any suitable orientation as needed or desired.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
 a shock attenuator configured to be coupled to a piston of a payload ejector, the shock attenuator configured to contact a payload carried by a flight vehicle and to push the payload away from the flight vehicle;
 wherein the shock attenuator comprises:
  a shock attenuator housing comprising an interior space and a spring or pliant material within the interior space; and
  a plunger movable within the interior space of the shock attenuator housing and extending from the shock attenuator housing, the plunger configured to be pushed at least partially into the shock attenuator housing while the plunger pushes against the spring or pliant material within the interior space in order to damp a shock pulse applied to the payload.

2. The apparatus of claim 1, wherein the shock attenuator further comprises a cap configured to be coupled to the shock attenuator housing in order to secure the plunger within the shock attenuator housing.

3. The apparatus of claim 2, wherein:
the plunger comprises a recess;
a portion of the cap fits within the recess; and
the spring or pliant material is positioned at least partially around the portion of the cap that fits within the recess.

4. The apparatus of claim 1, wherein:
the shock attenuator further comprises a fluid within the interior space; and
the plunger comprises at least one orifice configured to allow the fluid to pass through the plunger.

5. The apparatus of claim 1, wherein the shock attenuator further comprises at least one seal positioned between the plunger and the shock attenuator housing.

6. The apparatus of claim 1, wherein the shock attenuator housing is configured to be inserted into and secured to an inner piston sleeve that is movable within an outer piston sleeve such that the plunger extends beyond an end of the inner piston sleeve.

7. A system comprising:
a payload ejector configured to contact a payload carried by a flight vehicle and to push the payload away from the flight vehicle, the payload ejector comprising:
a piston configured to extend from the payload ejector; and
a shock attenuator coupled to the piston, the shock attenuator configured to push the payload away from the flight vehicle;
wherein the shock attenuator comprises:
a shock attenuator housing comprising an interior space and a spring or pliant material within the interior space; and
a plunger movable within the interior space of the shock attenuator housing and extending from the shock attenuator housing, the plunger configured to be pushed at least partially into the shock attenuator housing while the plunger pushes against the spring or pliant material within the interior space in order to damp a shock pulse applied to the payload.

8. The system of claim 7, wherein the shock attenuator further comprises a cap configured to be coupled to the shock attenuator housing in order to secure the plunger within the shock attenuator housing.

9. The system of claim 8, wherein:
the plunger comprises a recess;
a portion of the cap fits within the recess; and
the spring or pliant material is positioned at least partially around the portion of the cap that fits within the recess.

10. The system of claim 7, wherein:
the shock attenuator further comprises a fluid within the interior space; and
the plunger comprises at least one orifice configured to allow the fluid to pass through the plunger.

11. The system of claim 7, wherein the shock attenuator further comprises at least one seal positioned between the plunger and the shock attenuator housing.

12. The system of claim 7, wherein the piston comprises:
an outer sleeve configured to slide within an ejector housing of the payload ejector; and
an inner sleeve configured to slide within the outer sleeve, the shock attenuator positioned at an end of the inner sleeve.

13. The system of claim 7, wherein the payload ejector further comprises multiple mounting pads extending from an ejector housing, the mounting pads configured to contact the payload and limit side-to-side movement of the payload.

14. The system of claim 7, wherein the payload ejector further comprises a piston actuator configured to provide fluid that extends the piston from the payload ejector.

15. The system of claim 7, wherein the payload ejector comprises multiple pistons and multiple shock attenuators coupled to the pistons.

16. A method comprising:
extending a piston from a payload ejector;
contacting a payload carried by a flight vehicle using a shock attenuator coupled to the piston;
pushing the payload away from the flight vehicle using the shock attenuator and the piston, wherein the shock attenuator comprises:
a shock attenuator housing comprising an interior space and a spring or pliant material within the interior space; and
a plunger movable within the interior space of the shock attenuator housing and extending from the shock attenuator housing, the plunger configured to be pushed at least partially into the shock attenuator housing in order to damp a shock pulse applied to the payload; and
pushing the plunger at least partially into the shock attenuator housing while the plunger pushes against the spring or pliant material within the interior space.

17. The method of claim 16, wherein:
the shock attenuator housing further comprises a fluid within the interior space;
the plunger comprises at least one orifice; and
the method further comprises pushing the plunger at least partially into the shock attenuator housing while at least some of the fluid passes through the at least one orifice.

18. The method of claim 16, wherein:
the shock attenuator further comprises a cap coupled to the shock attenuator housing in order to secure the plunger within the shock attenuator housing;
the plunger comprises a recess;
a portion of the cap fits within the recess; and
the spring or pliant material is positioned at least partially around the portion of the cap that fits within the recess.

19. The method of claim 16, wherein extending the piston from the payload ejector comprises:
extending outer and inner sleeves of the piston from a piston housing; and
extending the inner sleeve from the outer sleeve; and
wherein the plunger extends beyond an end of the inner sleeve.

20. The method of claim 16, wherein:
the payload ejector further comprises multiple mounting pads extending from an ejector housing; and
the method further comprises contacting the payload with the mounting pads and limiting side-to-side movement of the payload.

* * * * *